United States Patent [19]

Klinedinst et al.

[11] Patent Number: 4,784,927
[45] Date of Patent: Nov. 15, 1988

[54] ELECTROCHEMICAL CELL USING IODINE MONOCHLORIDE

[75] Inventors: Keith A. Klinedinst, Marlborough; William D. K. Clark, Wayland, both of Mass.

[73] Assignee: Whittaker Corporation, Los Angeles, Calif.

[21] Appl. No.: 826,531

[22] Filed: Dec. 19, 1985

Related U.S. Application Data

[63] Continuation-in-part of Ser. No. 538,464, Oct. 3, 1983.

[51] Int. Cl.$^4$ .............................................. H01M 6/14
[52] U.S. Cl. .................... 429/196; 429/199; 429/29
[58] Field of Search ................ 429/196, 199, 101, 72, 429/29

[56] References Cited

U.S. PATENT DOCUMENTS

| | | | |
|---|---|---|---|
| 3,891,457 | 6/1975 | Auborn | 136/6 LN |
| 3,897,264 | 7/1975 | Auborn | 429/196 |
| 3,897,264 | 7/1975 | Auborn | 136/6 LN |
| 4,037,025 | 7/1977 | Dey et al. | 429/29 |
| 4,218,523 | 8/1980 | Kalnoki-Kis | 429/196 X |
| 4,259,420 | 3/1981 | Feiman et al. | 429/196 |
| 4,262,065 | 4/1981 | Giattino | 429/196 X |
| 4,263,378 | 4/1981 | Feiman et al. | 429/196 X |
| 4,327,159 | 4/1982 | Jones et al. | 429/196 X |
| 4,352,866 | 10/1982 | Klinedinst et al. | 429/196 X |
| 4,360,573 | 11/1982 | Rao et al. | 429/196 X |
| 4,516,317 | 5/1985 | Bailey | 429/196 X |

Primary Examiner—Peter A. Nelson
Attorney, Agent, or Firm—Donald E. Nist

[57] ABSTRACT

A primary electrochemical cell having an oxidizable active anode material, a cathode current collector, and an electrolytic solution. The electrolytic solution consists essentially of liquid cathode material, an electrolyte solute for imparting conductivity, and iodine monochloride for catalyzing the electroreduction of the liquid cathode material. In specific embodiments the anode material was lithium, the liquid cathode material was thionyl chloride or sulfuryl chloride and the electrolyte solute was lithium tetrachloroaluminate.

16 Claims, 2 Drawing Sheets

ELECTROCHEMICAL CELL USING IODINE MONOCHLORIDE

CROSS-REFERENCE TO RELATED APPLICATIONS

This application is related to application Ser. No. 538,465, filed Oct. 3, 1983, by Keith A. Klinedinst and William D. K. Clark entitled "Electrochemical Cell"; application Ser. No. 538,464, filed Oct. 3, 1983, by Keith A. Klinedinst and William D. K. Clark entitled "Primary Electrochemical Cell"; and application Ser. No. 809,747 filed Nov. 8, 1985 by Keith A. Klinedinst and William D. K. Clark entitled "Primary Electrochemical Cell," which application is a continuation-in-part of application Ser. No. 538,464.

BACKGROUND OF THE INVENTION

This invention relates to electrochemical cells. More particularly, it is concerned with primary electrochemical cells having an oxidizable active anode material, a cathode current collector, and an electrolytic solution comprising a reducible liquid cathode material and an electrolyte solute dissolved therein.

A particularly effective class of primary electrochemical cells which employs soluble or liquid cathode materials, as opposed to the more conventional solid cathode cells, has undergone rapid development in recent years. In these cells, the active cathode material is usually a fluid solvent for an electrolyte solute which provides conductivity. The active anode of the cell is usually lithium or other highly electropositive metal. During discharge the solvent is electrochemically reduced on a cathode current collector.

One particular type of electrochemical cell of the foregoing class which contains a lithium anode employs a reducible liquid cathode of an oxyhalide, specifically thionyl chloride or sulfuryl chloride. Typically the electrolyte solute dissolved in the oxyhalide solvent is lithium tetrachloroaluminate. Lithium/oxyhalide electrochemical cells have proven to have outstanding weight and volume energy density, long shelf life, and unusually high power density when compared with other cells previously available.

SUMMARY OF THE INVENTION

An electrochemical cell in accordance with the present invention which provides improved output voltage and output capacity comprises an oxidizable anode material, a cathode current collector, and an electrolytic solution in contact with the anode material and the cathode current collector. The electrolytic solution consists essentially of reducible liquid cathode material, an electrolyte solute dissolved in the reducible liquid cathode material for imparting conductivity to the electrolytic solution, and iodine monochloride for catalyzing the electroreduction of the liquid cathode material.

Figure 1:
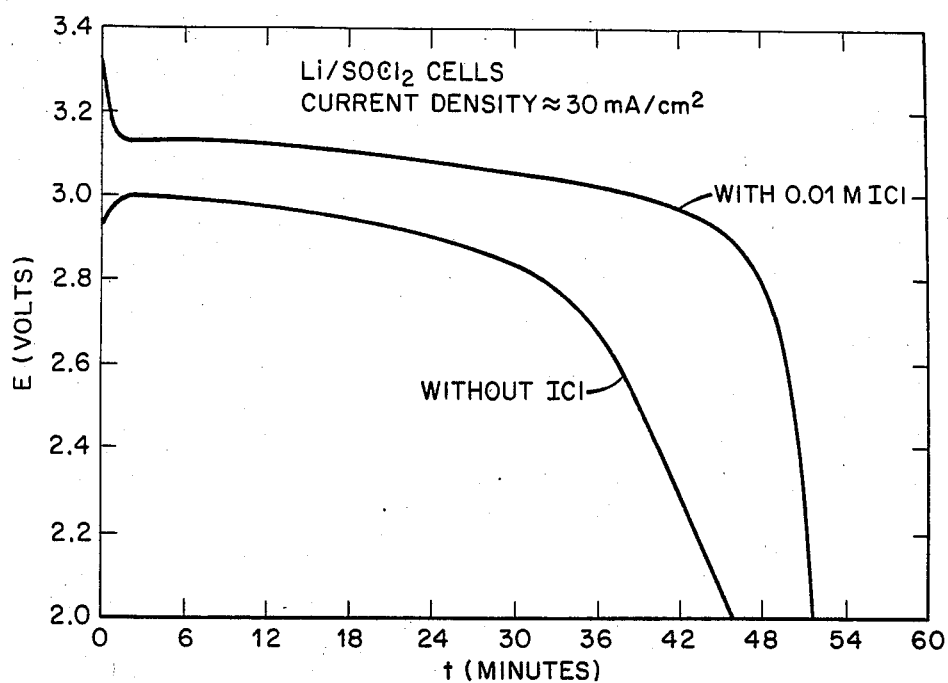
FIG. 1 shows curves of discharge characteristics of electrochemical cells employing a reducible liquid cathode material of thionyl chloride with and without a catalyst of iodine monochloride under one set of discharge conditions.

For a better understanding of the present invention, together with other and further objects, advantages, and capabilities thereof, reference is made to the following discussion and appended claims in connection with the above-described drawings.

DETAILED DESCRIPTION OF THE INVENTION

Electrochemical cells in accordance with the present invention employ an anode, a cathode current collector, and an electrolytic solution which is in contact with the anode and cathode current collector. The anode and cathode current collector are separated from each other as by a thin porous layer of insulating material. The electrolytic solution comprises a fluid, reducible solvent cathode material with an electrolyte solute and a catalyst of iodine monochloride dissolved therein.

The anode is an oxidizable material and is preferably lithium metal. Other oxidizable materials which may be employed in electrochemical cells of this type include other alkali metals and also alkaline earth metals. The electrolytic solution comprises a solvent of a reducible liquid cathode material. Among the cathode materials found useful are fluid oxyhalides, fluid non-metallic oxides, fluid non-metallic halides, fluid metallic halides, and mixtures thereof. The oxyhalides thionyl chloride ($SOCl_2$) and sulfuryl chloride ($SO_2Cl_2$) are preferred liquid cathode materials.

The electrolyte solute of the electrolytic solution may be $LiAlCl_4$, $LiAlBr_4$, $LiBCl_4$, $LiBF_4$, $LiAsF_6$, $LiSbCl_6$, $Li_2SnCl_6$, or $Li_2TiCl_6$. The electrolyte solute may also be a Lewis acid such as $AlCl_3$, $SnCl_4$, $TiCl_4$, $SbCl_5$, or $BCl_3$, or a combination of a Lewis acid with a Lewis base such as $LiCl$, $LiBr$, or $LiF$. The molarity of the solute in the solution is usually from about 0.5 to about 2.5M. In lithium/oxyhalide cells the molarity of the solute is preferably from about 1.5 to about 2.0M.

In accordance with the present invention, the electrolytic solution also includes an electroreducing catalyst of iodine monochloride (ICl).

The following examples are for the purpose of further illustrating and explaining the present invention, and are not to be taken as limiting the scope thereof.

EXAMPLE I

Test electrochemical cells were constructed with polished vitreous carbon working electrodes and with lithium counter and reference electrodes. The cells contained an electrolytic solution of 1.0M lithium tetrachloroaluminate ($LiAlCl_4$) in thionyl chloride ($SOCl_2$). (A quantity of $POCl_3$ was added as a cosolvent. This cosolvent does not interfere with the operation of the cell since it is reduced below 2.0 V upon the vitreous carbon working electrode.) Cells of this type were discharged at ambient temperature with constant 3.2 mA/cm² current densities both with and without the addition of 0.1M of ICl catalyst to the oxyhalide electrolyte. The resulting discharge characteristics are listed in Table I. A 510 mV increase in average load voltage and a 435% increase in discharge capacity were achieved by the addition of 0.1M ICl to the $SOCl_2$ electrolyte.

TABLE I

Li/SOCl₂ Discharge Characteristics at 3.2 mA/cm²
vs
Catalyst Concentration

| ICl(Moles/l) | $E_{avg}$(Volts) | Capacity (mC/cm²) |
|---|---|---|
| 0.00 | 2.73 | 34 |
| 0.10 | 3.24 | 182 |

EXAMPLE II

Cells identical to those described in Example I were discharged at constant 6.4 mA/cm² rates to yield the discharge characteristics listed in Table II. Addition of the electrocatalyst ICl to the $SOCl_2$ electrolyte resulted in a 550 mV increase in average load voltage and a 185% increase in discharge capacity.

TABLE II

Li/SOCl₂ Discharge Characteristics at 6.4 mA/cm²
vs
Catalyst Concentration

| ICl(Moles/l) | $E_{avg}$(Volts) | Capacity (mC/cm²) |
|---|---|---|
| 0.00 | 2.68 | 25.4 |
| 0.10 | 3.23 | 72.8 |

EXAMPLE III

Test electrochemical cells were constructed with polished vitreous carbon working electrodes and with lithium counter and reference electrodes. The cells contained an electrolytic solution of 1.0M lithium tetrachloroaluminate (LiAlCl₄) in sulfuryl chloride (SO₂Cl₂) (A quantity of POCl₃ was added as a cosolvent. This cosolvent does not interfere with the operation of the cell since it is reduced below 2.0 V upon the vitreous carbon working electrode.) Cells of this type were discharged at ambient temperature with constant 3.2 mA/cm² current densities both with and without the addition of 0.1M of ICl catalyst to the oxyhalide electrolyte. The resulting discharge characteristics are listed in Table III. A 50 mV increase in average load voltage and a 11-fold increase in discharge capacity were achieved by the addition of 0.1M ICl to the $SO_2Cl_2$ electrolyte.

TABLE III

Li/SO₂Cl₂ Discharge Characteristics at 3.2 mA/cm²
vs
Catalyst Concentration

| ICl(Moles/l) | $E_{avg}$(Volts) | Capacity (mC/cm²) |
|---|---|---|
| 0.00 | 3.20 | 45 |
| 0.10 | 3.25 | 549 |

EXAMPLE IV

Cells identical to those in Example III were discharged at constant 6.4 mA/cm² rates. The resulting discharge characteristics are listed in Table IV. A 260 mV increase in average load voltage and a 450% increase in discharge capacity resulted from the addition of the ICl electrocatalyst.

TABLE IV

Li/SO₂Cl₂ Discharge Characteristics at 6.4 mA/cm²
vs
Catalyst Concentration

| ICl(Moles/l) | $E_{avg}$(Volts) | Capacity (mC/cm²) |
|---|---|---|
| 0.00 | 3.00 | 42 |
| 0.10 | 3.26 | 230 |

EXAMPLE V

Cells identical to those described in Example III were discharged at constant 19.2 mA/cm² rates. The resulting discharge characteristics are listedin Table V. A 330 mV increase in average load voltage and a 445% increase in discharge capacity resulted from the addition of the ICl electrocatalyst.

TABLE V

Li/SO₂Cl₂ Discharge Characteristics at 19.2 mA/cm²
vs
Catalyst Concentration

| ICl(Moles/l) | $E_{avg}$(Volts) | Capacity (mC/cm²) |
|---|---|---|
| 0.00 | 2.94 | 17.3 |
| 0.10 | 3.27 | 94.5 |

EXAMPLE VI

Cells identical to those in Example III were discharged at constant 32.0 mA/cm² rates. The resulting discharged characteristics are listed in Table VI. Addition of the ICl electrocatalyst to the $SO_2Cl_2$ electrolyte resulted in a 290 mV increase in average load voltage and a 235% increase in discharge capacity.

TABLE VI

Li/SO₂Cl₂ Discharge Characteristics at 32.0 mA/cm²
vs
Catalyst Concentration

| ICl(Moles/l) | $E_{avg}$(Volts) | Capacity (mC/cm²) |
|---|---|---|
| 0.00 | 2.70 | 13.3 |
| 0.10 | 2.99 | 44.8 |

EXAMPLE VII

Li/SOCl₂ cells were constructed with PTFE-bonded Shawinigan acetylene black cathodes (5 cm²×1 mm) and with 1.0M LiAlCl₄ in SOCl₂ as electrolyte. To the electrolyte was added iodine monochloride to catalyze the electroreduction of SOCl₂, the iodine monochloride concentration ranging between 0.0M and 0.1M. These cells were discharged at ambient temperature through 20 ohm loads to yield the average load voltages, current densities, and discharge capacities listed in Table VII. As shown, the overvoltage for SOCl₂ reduction was reduced by 160 mV and the discharge capacity was increased by 40% by the addition of 0.10M ICl to the SOCl₂ electrolyte. Discharge curves for cells without the ICl catalyst and with 0.10M ICl are shown in FIG. 1.

TABLE VII

Li/SOCl₂ Cell Constant Load Discharge Characteristics at Ambient Temperature vs ICl Catalyst Concentration

| ICl(Moles/l) | $E_{avg}$(Volts) | $I_{avg}$(mA/cm²) | Capacity (mAhr/cm²) |
|---|---|---|---|
| 0.00 | 2.89 | 28.9 | 18.9 |
| 0.05 | 2.93 | 29.3 | 24.1 |

TABLE VII-continued

Li/SOCl₂ Cell Constant Load Discharge Characteristics at Ambient Temperature vs ICl Catalyst Concentration

| ICl(Moles/l) | $E_{avg}$(Volts) | $I_{avg}$(mA/cm²) | Capacity (mAhr/cm²) |
|---|---|---|---|
| 0.10 | 3.05 | 30.5 | 26.1 |

EXAMPLE VIII

Figure 2:
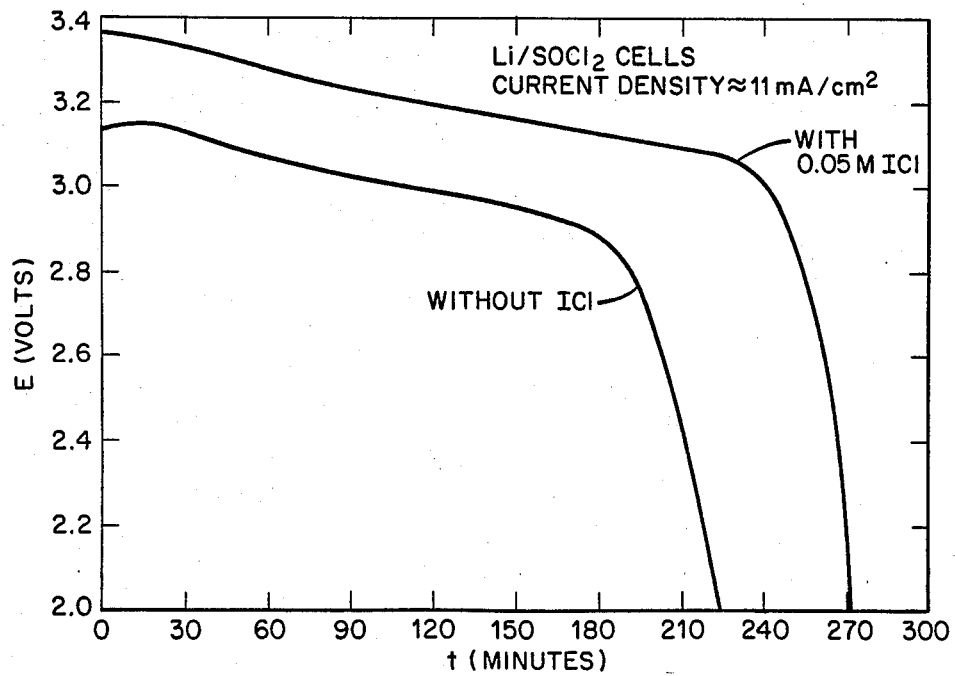
FIG. 2 shows curves of discharge characteristics of electrochemical cells employing a reducible liquid cathode material of thionyl chloride with and without a catalyst of iodine monochloride under another set of discharge conditions.

Li/SOCl₂ cells identical to those Example VII with ICl concentration ranging between 0.00M and 0.20M were discharged through 57 ohm loads. The resulting discharge characteristics are listed in Table VIII. The discharge curves obtained with and without the addition of 0.05M ICl to the SOCl₂ electrolyte are compared in FIG. 2. The addition of 0.05M ICl catalyst produced a 170 mV increase in average load voltage and a 40% increase in discharge capacity.

TABLE VIII

Li/SOCl₂ Cell Constant Load Discharge Characteristics At Ambient Temperature vs ICl Catalyst Concentration

| ICl(Moles/l) | $E_{avg}$(Volts) | $I_{avg}$(mA/cm²) | Capacity (mAhr/cm²) |
|---|---|---|---|
| 0.00 | 3.02 | 10.6 | 34.6 |
| 0.05 | 3.19 | 11.2 | 48.7 |
| 0.10 | 3.22 | 11.3 | 44.6 |
| 0.20 | 3.29 | 11.6 | 41.5 |

EXAMPLE IX

Figure 3:
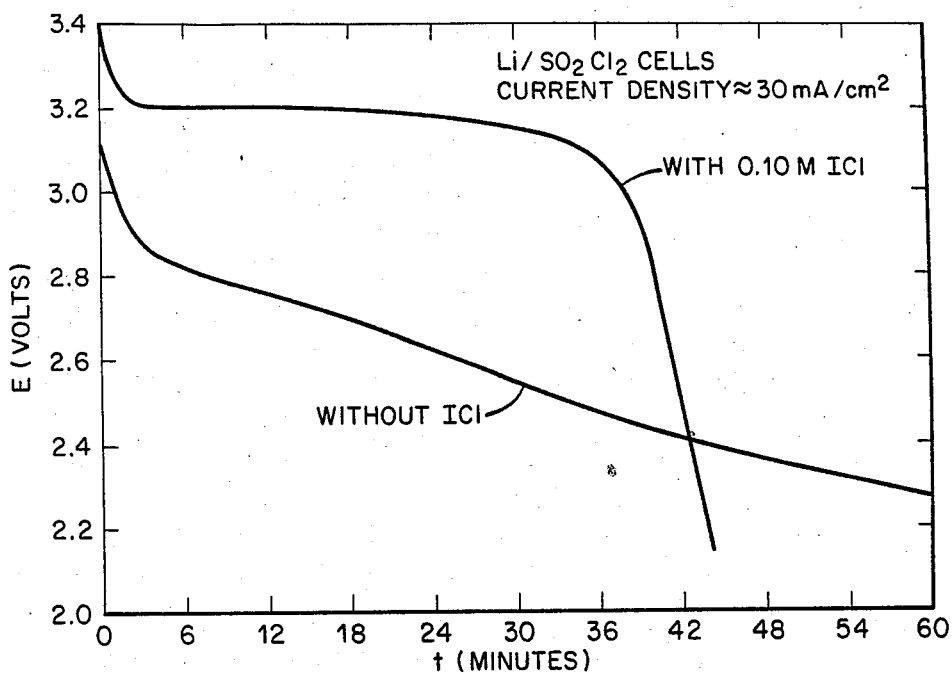
FIG. 3 shows curves of discharge characteristics of electrochemical cells employing a reducible liquid cathode material of sulfuryl chloride with and without a catalyst of iodine monochloride under one set of discharge conditions.

Li/SO₂Cl₂ cells were constructed with PTFE-bonded i Shawinigan acetylene black cathodes (5 cm²×1 mm) and with 1.0M LiAlCl₄ in SO₂Cl₂ as electrolyte. To the electrolyte was added iodine monochloride to catalyze the electroreduction of SO₂Cl₂, the iodine monochloride concentration ranging between 0.0M and 0.10M. These cells were discharged at ambient temperature through 20 ohm loads to yield the average load voltages, current densities, and discharge capacities listed in Table IX. As shown, the overvoltage for SO₂Cl₂ reduction was reduced by 430 mV and the discharge capacity was increased by 65% by the addition of 0.10M ICl to the SO₂Cl₂ electrolyte. Discharge curves for cells without the ICl catalyst and with 0.10M ICl are shown in FIG. 3.

TABLE IX

Li/SO₂Cl₂ Cell Constant Load Discharge Characteristics At Ambient Temperature vs ICl Catalyst Concentration

| ICl(Moles/l) | $E_{avg}$(Volts) | $I_{avg}$(mA/cm²) | Capacity (mAhr/cm²) |
|---|---|---|---|
| 0.00 | 2.71 | 27.1 | 15.3 |
| 0.05 | 3.09 | 30.9 | 22.6 |
| 0.10 | 3.14 | 31.4 | 25.4 |

EXAMPLE X

Figure 4:
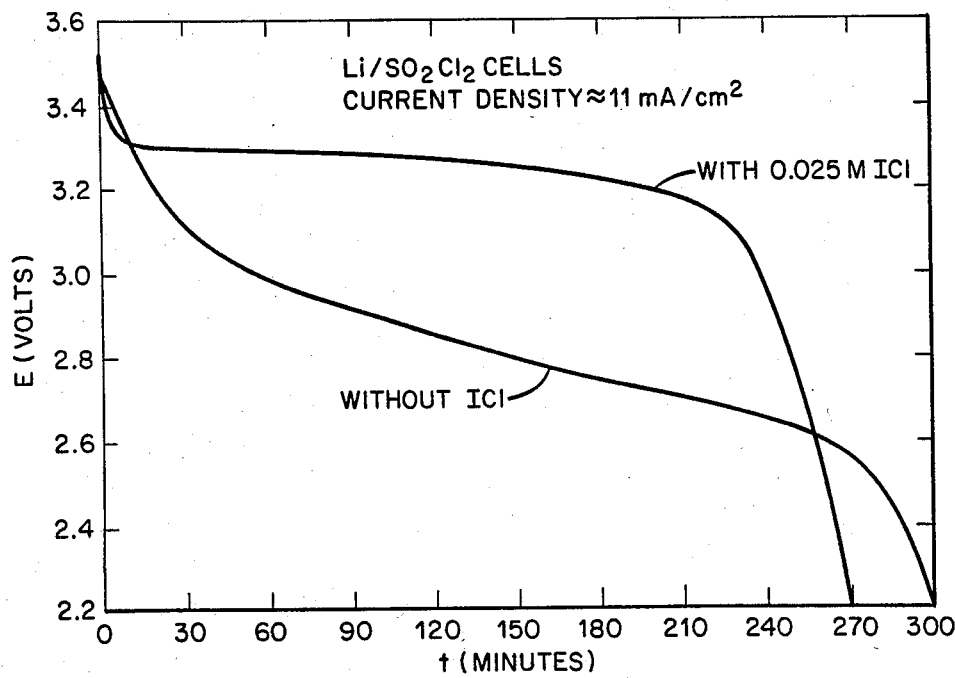
FIG. 4 shows curves of discharge characteristics of electrochemical cells employing a reducible liquid cathode material of sulfuryl chloride with and without a catalyst of iodine monochloride under another set of discharge conditions.

Li/SO₂Cl₂ cells identical to those described in Example IX with ICl concentrations ranging between 0.00M and 0.10M were discharged through 57 ohm loads. The resulting discharge characteristics are tabulated in Table X. The discharge curves obtained with and without the addition of 0.05M ICl to the SO₂Cl₂ electrolyte are compared in FIG. 4. As shown, a 150 mV increase in average load voltage and a 70% increase in discharge capacity resulted from the addition of 0.05 M ICl to the SO₂Cl₂ electrolyte.

TABLE X

Li/SO₂Cl₂ Cell Constant Load Discharge Characteristics At Ambient Temperature vs ICl Catalyst Concentration

| ICl(Moles/l) | $E_{avg}$(Volts) | $I_{avg}$(mA/cm²) | Capacity (mAhr/cm²) |
|---|---|---|---|
| 0.000 | 3.02 | 10.6 | 27.6 |
| 0.010 | 3.17 | 11.1 | 47.0 |
| 0.025 | 3.24 | 11.4 | 43.9 |
| 0.05 | 3.26 | 11.4 | 38.7 |
| 0.10 | 3.26 | 11.4 | 34.3 |

As shown by the foregoing examples, iodine monochloride is an effective oxyhalide electroreduction catalyst. It has been found particularly effective at concentrations between 0.01M and 0.20M.

The mechanism by which small quantities of iodine monochloride catalyze the electroreduction of oxyhalides has not been determined with certainty. It is known that I⁻ is readily converted to Cl⁻ by reaction with SOCl₂ (via the formation of the relatively unstable thionyl iodide).

$$4I^- + 2SOCl_2 \rightarrow S + SO_2 + 2I_2 + 4Cl^- \tag{1}$$

As disclosed in applicant's aforementioned application Ser. No. 809,747, small quantities of I₂ have been found to be an effective catalyst for the electroreduction of SOCl₂. The following reactions have been proposed to explain this catalysis.

Electrochemical Reaction:

$$2I_2(adsorbed) + 4e^- \rightarrow 4I^- \tag{2}$$

Chemical Reaction:

$$4I^- + 2SOCl_2 \rightarrow S + SO_2 + 2I_2 + 4Cl^- \tag{3}$$

Overall Reaction:

$$2SOCl_2 + 4e^- \rightarrow S + SO_2 + 4Cl^- \tag{4}$$

Assuming that, on a carbon electrode, the electroreduction of iodine monochloride occurs more rapidly and at higher potentials than the electoreduction of thionyl chloride, the following series of reactions constitute a possible mechanism by which iodine monochloride may catalyze the reduction of thionyl chloride on a carbon electrode.

Electrochemical Reactions:

$$2ICl(adsorbed) + 2e^- \rightarrow 2I° + 2Cl^- \tag{5}$$

$$2I° + 2e^- \rightarrow 2I^- \tag{6}$$

Chemical Reaction:

$$2I^- + SOCl_2 \rightarrow \tfrac{1}{2}S + \tfrac{1}{2}SO_2 + I_2 + 2Cl^- \tag{7}$$

Overall Reaction:

$$2ICl + SOCl_2 + 4e^- \rightarrow \tfrac{1}{2}S + \tfrac{1}{2}SO_2 + I_2 + 4Cl^- \tag{8}$$

These reactions would be followed by similar reaction involving molecular iodine (reactions (2) through (4) above). The net result is that thionyl chloride is reduced at potentials governed by the I₂/I⁻ redox couple.

By analogy, assuming that the electroreduction of iodine monochloride occurs more rapidly and at higher potentials than the electroreduction of sulfuryl chloride, the following series of reactions constitute a possible mechanism by which iodine monochloride may catalyze the reduction of sulfuryl chloride on a carbon electrode.

Eletrochemical Reaction:

$$2ICl(adsorbed) + 2e^- \rightarrow 2I^\circ(adsorbed) + 2Cl^- \qquad (9)$$

Chemical Reaction:

$$2I^\circ(adsorbed) + SO_2Cl_2 \rightarrow SO_2 + 2ICl(adsorbed) \qquad (10)$$

Overall Reaction $$SO_2Cl_2 + 2e^- \rightarrow SO_2 + 2Cl^- \qquad (11)$$

While there have been shown and described what are considered preferred embodiments of the present invention, it will be obvious to those skilled in the art that various changes and modifications may be made therein without departing from the invention as defined by the appended claims.

We claim:

1. An electrochemical cell comprising
   an oxidizable anode material;
   a cathode current collector of inert electrically conductive material; and
   an electrolytic solution, in contact with the anode material and the cathode current collector;
   said electrolytic solution consisting essentially of a reducible liquid cathode material which is electrochemically reduced on the cathode current collector, an electrolyte solute dissolved in the reducible liquid cathode material for imparting conductivity to the electrolytic soltuion, and a small quantity of iodine monochloride which catalyzes the electroreduction of the liquid cathode material on the cathode current collector.

2. An electrochemical cell in accordance with claim 1 wherein
   the electrolyte solute is LiAlCl$_4$, LiAlBr$_4$, LiBCl$_4$, LiBF$_4$, LiAsF$_6$, LiSbCl$_6$, Li$_2$SnCl$_6$, Li$_2$TiCl$_6$, AlCl$_3$, SnCl$_4$, TiCl$_4$, SbCl$_5$, BCl$_3$, or a combination of AlCl$_3$, SnCl$_4$, TiCl$_4$, SbCl$_5$, or BCl$_3$ with LiCl, LiBr, or LiF.

3. An electrochemical cell in accordance with claim 2 wherein
   the reducible liquid cathode material is selected from the group consisting of fluid oxyhalides, fluid non-metallic oxides, fluid non-metallic halides, fluid metallic halides, and mixtures thereof.

4. An electrochemical cell in accordance with claim 3 wherein
   the oxidizable anode material is an alkali metal or an alkaline earth metal.

5. An electrochemical cell in accordance with claim 4 wherein
   the concentration of iodine monochloride in the electrolytic solution is between about 0.01M and 0.2M.

6. An electrochemical cell in accordance with claim 5 wherein
   the oxidizable anode material is lithium.

7. An electrochemical cell in accordance with claim 6 wherein
   the electrolyte solute is lithium tetrachloroaluminate.

8. An electrochemical cell in accordance with claim 7 wherein
   the reducible liquid cathode material is thionyl chloride.

9. An electrochloride cell in accordance with claim 7 wherein
   the reducible liquid cathode material is sulfuryl chloride.

10. An electrochemical cell in accordance with claim 1 wherein
    the concentration of iodine monochloride in the electrolytic solution is between about 0.01M and 0.2M.

11. An electrochemical cell in accordance with claim 10 wherein
    the electrolyte solute is LiAlCl$_4$, LiAlBr$_4$, LiBCl$_4$, LiBF$_4$, LiAsF$_6$, LiSbCl$_6$, Li$_2$SnCl$_6$, Li$_2$TiCl$_6$, AlCl, SnCl$_4$, TiCl$_4$, SbCl$_5$, BCl$_3$, or a combination of AlCl$_3$, SnCl$_4$, TiCl$_4$, SbCl$_5$, or BCl$_3$ with LiCl, LiBr, or LiF.

12. An electrochemical cell in accordance with claim 11 wherein
    the oxidizable anode material is an alkali metal or an alkaline earth metal; and
    the reducible liquid cathode material is selected from the group consisting of fluid oxyhalides, fluid non-metallic oxides, fluid non-metallic halides, fluid metallic halides, and mixtures thereof.

13. An electrochemical cell in accordance with claim 12 wherein
    the oxidizable anode material is lithium.

14. An electrochemical cell in accordance with claim 13 wherein
    the electrolyte solute is lithium tetrachloroaluminate.

15. An electrochemical cell in accordance with claim 14 wherein
    the reducible liquid cathode material is thionyl chloride.

16. A electrical cell in accordance with claim 14 wherein
    the reducible liquid cathode material is sulfuryl chloride.

* * * * *